(12) United States Patent
Zhang et al.

(10) Patent No.: US 9,015,988 B2
(45) Date of Patent: Apr. 28, 2015

(54) INSECT VISUAL ATTRACTANT

(71) Applicant: Sterling International, Inc., Spokane, WA (US)

(72) Inventors: Qing-He Zhang, Spokane Valley, WA (US); Rodney G. Schneidmiller, Greenacres, WA (US); Marc Chapin, Spokane, WA (US); Steven A. Hastings, Bellevue, WA (US)

(73) Assignee: Sterling International Inc., Spokane, WA (US)

( * ) Notice: Subject to any disclaimer, the term of this patent is extended or adjusted under 35 U.S.C. 154(b) by 169 days.

(21) Appl. No.: 13/911,033

(22) Filed: Jun. 5, 2013

(65) Prior Publication Data

US 2013/0318854 A1 Dec. 5, 2013

Related U.S. Application Data (60) Provisional application No. 61/655,944, filed on Jun. 5, 2012, provisional application No. 61/681,564, filed on Aug. 9, 2012, provisional application No. 61/732,891, filed on Dec. 3, 2012.

(51) Int. Cl.
*A01M 1/20* (2006.01)
*A01M 1/14* (2006.01)
*A01M 31/06* (2006.01)
*A01M 31/00* (2006.01)

(52) U.S. Cl.
CPC ............... *A01M 1/145* (2013.01); *A01M 31/06* (2013.01); *A01M 31/008* (2013.01)

(58) Field of Classification Search
USPC .................. 43/107, 132.1, 114, 136
See application file for complete search history.

(56) References Cited

U.S. PATENT DOCUMENTS

| | | | | |
|---|---|---|---|---|
| 3,708,908 A | * | 1/1973 | Levey | 43/114 |
| 4,490,938 A | * | 1/1985 | Baker | 43/114 |
| 4,577,434 A | * | 3/1986 | Davis | 43/115 |
| 4,899,485 A | | 2/1990 | Schneidmiller | |
| 5,048,224 A | * | 9/1991 | Frisch | 43/114 |

(Continued)

FOREIGN PATENT DOCUMENTS

| | | |
|---|---|---|
| JP | 2000-060404 A | 2/2000 |
| JP | 2002-084958 A | 3/2002 |

OTHER PUBLICATIONS

International Search Report and Written Opinion mailed Oct. 28, 2013, issued in corresponding International Application No. PCT/US2013/044374, filed Jun. 5, 2013, 7 pages.

(Continued)

*Primary Examiner* — Christopher P Ellis
(74) *Attorney, Agent, or Firm* — Christensen O'Connor Johnson Kindness PLLC (57) ABSTRACT

A visual attractant for attracting a target insect include a substrate having a pixelated pattern portion defined by a plurality of blocks having a characteristic dimension that is within an order of magnitude of the size of the target insect. The plurality of blocks are colored to be highly reflective in a wavelength range selected to attract the target insect. A background portion is lighter in color than the pixelated pattern, to contrast sharply therewith. The blocks are clustered on the substrate such that most of the plurality of blocks define one or more irregular elongate streaks on the substrate. The pixelated pattern may be applied to a strip or to a pillar device, which may be adhesive.

30 Claims, 8 Drawing Sheets

(56) References Cited

U.S. PATENT DOCUMENTS

| | | |
|---|---|---|
| 5,540,011 A | 7/1996 | Groom |
| 5,900,244 A | 5/1999 | Howse |
| 5,907,923 A * | 6/1999 | Heath et al. ............... 43/122 |
| 6,792,713 B2 | 9/2004 | Snell |
| 6,966,142 B1 * | 11/2005 | Hogsette et al. ............... 43/107 |
| 7,886,481 B2 | 2/2011 | Schneidmiller |
| 8,079,175 B2 * | 12/2011 | Calkins et al. ............... 43/114 |
| 8,336,251 B2 | 12/2012 | Orchard |
| 2003/0233784 A1 | 12/2003 | Feldhege |
| 2006/0248783 A1 | 11/2006 | Lindquist |
| 2010/0024278 A1 | 2/2010 | Simchoni-Barak |
| 2010/0229459 A1 | 9/2010 | Simchoni-Barak |
| 2012/0317869 A1 | 12/2012 | Johnston |

OTHER PUBLICATIONS

Kugel, M., "The Time Course of the Electroretinogram of Compound Eyes in Insects and Its Dependence on Special Recording Conditions," The Journal of Experimental Biology 71:1-6, 1977.

Ruck, P., "Electrophysiology of the Insect Dorsal Ocellus," The Journal of General Physiology, Jan. 1, 1961, pp. 605-627, <http://jgp.rupress.org> [retrieved May 7, 2013].

Silver, W.L., and J.C. Smith, "Sensory Biology: Examination of Electroretinograms From Photoreceptors in Insects," Tested Studies for Laboratory Teaching, 20:327-333.

* cited by examiner

| | | | |
|---|---|---|---|
| ▨ GREEN | | ▨ 40% GREEN, 60% YELLOW | |
| ▨ 60% GREEN, 40% YELLOW | | ▨ YELLOW | |

INSECT VISUAL ATTRACTANT

CROSS-REFERENCES TO RELATED APPLICATIONS

This application claims the benefit of Provisional Application No. 61/655,944, filed Jun. 5, 2012, and claims the benefit of Provisional Application No. 61/681,564, filed Aug. 9, 2012, and also claims the benefit of Provisional Application No. 61/732,891, filed Dec. 3, 2012. The disclosures of each of these provisional applications are hereby incorporated by reference in their entireties.

BACKGROUND

Insects of the order Diptera, sometimes referred to as "true flies," and including, for example, houseflies, horse-flies, stable flies, sand flies, and mosquitoes, are often significant disease vectors, nuisances, and pests. Similarly, insects of the order Hymenoptera, which include flying insects such as sawflies, social wasps, and bees, can also be significant nuisances and pests. Many wasps, for example, have painful venous stingers. However, some flies (such as tachina flies, robber flies, and hover flies), wasps, and bees also provide benefits in certain circumstances. For example, certain wasps and flies prey on or parasitize agricultural pests, and are therefore increasingly being used for agricultural pest control as beneficial insects.

For example, the housefly, *Musca domestica* L. (Diptera: Muscidae), is one of the most important hygiene pests worldwide. The flies not only are a nuisance, irritating people and animals and leaving regurgitation and faecal spots on surfaces, but they are also vectors of pathogens that may cause serious diseases in humans and animals. Therefore, a lot of effort has been directed to combating this problem. Due to their reproductive rate, houseflies have developed resistance against various commonly used insecticides. Even insecticides that are effective against houseflies are not a viable option to many persons who have concerns regarding personal health effects, environmental effects, and the like. Certain semiochemical-baited traps may be very efficient at catching flies, but are typically restricted to outdoor use due to their olfactory properties, such as offensive odors.

Like many other insects, flies and wasps are well adapted for sensing visual aspects of their environment. Typically, flies and wasps have both a large pair of compound eyes and one or more "simple eyes," or ocelli. Visual signals play a critical role in insect mating, food-finding, and defense, among any other functions.

As noted above, many insect species are beneficial. Certain wasps play an important role in natural or biological control due to their propensity to prey on or parasitize various insect pests. Other beneficial insects include the spined soldier bugs among other true bugs (Suborder: Heteroptera), lacewings and ant linons (Order: Neuroptea), and dragonflies (Order: Odonata). Many species of insects are beneficial pollinators (e.g., bees, honeybees, solitary bees, and bumblebees (Order: Hymenoptera). Many of these beneficial insects also have well-developed vision. It would be advantageous to attract beneficial insects to desired areas, for example to gardens or agricultural fields, via either olfactory or visual signal, or both.

Fly paper for entrapping flies and other flying insects are known in the art. For example, prior art fly paper rolls for hanging in rooms from a ceiling are known. Fly paper strips are typically formed as long, narrow, flexible substrates covered with a nonpoisonous sticky coating, and are usually brown in color. A fly landing on the sticky substance becomes entrapped, unable to detach from the fly paper strip.

Hanging strips of conventional fly paper from a ceiling is inconvenient. Such fly paper strips have a length of approximately one meter. Therefore, ceilings must be relatively high in order to accommodate the fly paper strips without interfering with normal occupancy of the room. It can be difficult to install fly tape strips on a ceiling, requiring using a ladder or other elevating device. It will also be appreciated that flies may not spend much time flying near the ceiling because food sources are typically closer to the ground. Therefore, a large portion of the deployed fly tape may be disposed in a region that is sparsely populated with flies.

Conventional fly tape packages are designed such that the fly tape strip is substantially removed from its container either before or during hanging. Therefore, the user hanging the tape may end up with the sticky substance on his or her hands during the deployment of the fly tape.

The effectiveness of any entrapment device such as fly tape depends on the target insects physically engaging the entrapment device. Attracting flies to the fly tape will clearly improve its effectiveness. Prior art fly tape also does not take advantage of the natural visual development of the housefly. Common houseflies have well-developed compound eyes, and vision is an important sense in this species. Adult flies are known to be phototactic, i.e., they are attracted towards light. The photoreceptors in the compound eyes are sensitive to ultraviolet and blue-green light.

Despite many experimental trials of different visual attractants, there remains a great deal of uncertainty about which combinations of color and patterns are most effective at luring common houseflies. Several novel, non-toxic, non-chemical methods and devices that use the innate optical characteristics of a target insect to attract and trap the insects are herein disclosed. For example, a visual attractant in accordance with the present invention may be used to lure pestiferous insects towards sticky traps, such as strips or sticks, and/or away from human populations or crops. A particular embodiment is disclosed with a novel dispenser/cartridge for the sticky fly tape, and/or having a visual attractant disposed on the fly tape. Similarly, a visual attractant may be used to lure beneficial insects toward a desired area, for example, to a garden or planted field as an enhanced biological and natural control tactic.

In some embodiments, the natural social and/or predatory nature of target insects are also exploited to attract the target insects by providing a substrate with visual features that simulate insects, for example, images, silhouettes, or caricatures of the target insect or of prey of the target insect.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A visual attractant for attracting a target insect, for example filth flies, biting flies, wasps, or beneficial insects, includes a substrate that includes a pattern formed with a plurality of blocks sized on the order of the size of the target insect, and colored to be highly reflective in a wavelength selected to attract the target insect. The substrate further includes a background portion that is a lighter color than the blocks, providing a sharp contrast, such that the blocks define an irregular edge. The blocks are clustered on the substrate, such that most of the blocks define one or more irregular, intermittent elongate streak on the substrate.

The blocks may be highly reflective in the wavelength range of 450 nm-515 nm, for example to attract biting flies and/or filth flies. The blocks may be highly reflective in the wavelength range of 495 nm-515 nm, for example to attract wasps. The background may further include lighter-colored blocks, for example blocks reflective in the wavelength range of 520 nm-565 nm.

In an embodiment, the substrate further comprises images of insects, for example the target insect, wherein the images may be photorealistic images, caricature images, and/or silhouette images.

In an embodiment the substrate further comprises an adhesive coating for entrapping or capturing the target insect. For example, the pixelated pattern may be formed with a suitably colored adhesive.

In an embodiment, the visual attractant is provide on a sticky tape disposed in a two-part cartridge having a body portion that rotatably mounts a roll of fly tape with the visual attractant imprinted thereon, and a cover portion that is fixedly attached to the end of the fly tape.

In an embodiment, the substrate with the visual attractant defines an outer wall of a cylindrical pillar, for example a polygonal cylinder, and may be adhesive. The pillar may include end caps, which may include lighting means.

A fly tape configured to entrap a target insect includes an elongate substrate having an adhesive surface with an irregular pattern configured to define a visual attractant for the target insect. The pattern comprises a plurality of colored blocks that are highly reflective in a wavelength that is attractive to the target insect, are sized to be on the order of the size of the target insect, and are clustered to define elongate, intermittent streaks.

In an embodiment for certain flies, the blocks are highly reflective in a wavelength range of 450 nm-495 nm, and in an embodiment for wasps, the blocks are highly reflective in a wavelength range of 495 nm-515 nm. A background portion may be highly reflective in a wavelength range of 520 nm-565 nm.

In an embodiment, the fly tape further includes a plurality of insect images, for example images of the target insect. In exemplary embodiments, the images are photorealistic images, caricature images, and/or silhouette images.

In an embodiment the elongate substrate defines the outer surface of a cylindrical pillar.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Many insects have very highly developed visual sensory apparatus, and photoreception is of central importance in the behavior of such insects. Invertebrate photoreceptors, for example photoreceptors in insects, are different in both their morphological organization and their underlying biochemical pathways than photoreceptors in vertebrates.

Compound eyes, for example have multiple facets with a corneal lens over each photoreceptive structure called an ommatidium. Insects may have from hundreds to many thousand ommatidia, each ommatidium receiving light from a different part of the insect's external world. For example, the compound eye of the fruit fly contains 760 ommatidia. Each ommatidium contains eight photoreceptor cells (R1-R8), support cells, pigment cells, and a cornea. In addition, an insect may have one or several (frequently three) "simple eyes," or ocelli (sometimes called a pigment pit). The ocelli coexist with the compound eyes, and therefore most insects have two anatomically separate and functionally different visual pathways.

However, an insect's nerve system and brain are relatively simple, with a dorsal brain linked to a ventral nerve cord comprising a paired segmental ganglia. For example, an insect's brain typically comprises a complex of six fused ganglia, each part controlling a limited spectrum of activities in the insect's body. Images of like insects (e.g., for social insects) or of prey insects may trigger behavioral responses in the target insects to further attract them to the patterns. Therefore, typically the insect's behavior is very strongly and directly tied to the electrical activity in the insect's eyes.

Understanding colors that are highly attractive to pest insects can greatly improve the design of traps for monitoring and controlling pest populations.

The present inventors developed a method to analyze the pest-attracting efficacy of different colors (under particular environmental light conditions) in terms of an insect's perception of visual stimuli. Particular colors are identified by what sort of nerve signals are generated by an insect's visual sensory machinery. The testing procedure began by selecting a set of candidate colors to use with a sticky trap substrate, and then analyzing the colors for the traps with a spectrometer to get the relative reflectance of the color across the UV/Visible region. Also, the environmental light spectrum for the UV/Visible region was taken simulating the environmental conditions under which the experiments would be conducted (e.g., the spectra of fluorescent lights). Combining these two sets of measured spectra, the precise spectra of light reflecting or scattering from the traps and directly entering the insects' eyes was obtained. The spectral sensitivities for the fly photoreceptors were either acquired from the literature or measured by the inventors using an electroretinogram (ERG) technique. These spectral sensitivities were combined with the color spectra of the actual traps to determine the activations of individual fly photoreceptor classes by these traps.

Behavioral experiments were conducted using sets of traps that were identical in design except for the color. Three separate experiments were conducted to acquire data. The first experiment used approximately square plastic panels painted with the test color and covered with TangleFoot® glue. These panels were attached to the wall of a wind tunnel. The second and third experiments used tall/narrow strips of either colored paper or white paper colored with markers and covered with TangleFoot® glue. These strips were hung from the ceiling of the wind tunnel. In each experiment, approximately 100-200 houseflies (mixed male/female, ca. 1- to 3-day old) were released.

Trap catch data from the experiments were fed into statistical models as the response variable. Trap photoreceptor activations were used as the main independent variables. The effect size and sign of three photoreceptor class variables determined from these statistical models indicate the contribution to a color's attractivity from activation of that photoreceptor (i.e., a highly positive effect means activating that photoreceptor will highly increase attraction to that color, whereas a slightly negative effect means activating that photoreceptor will slightly decrease attraction to that color).

All three experiments gave qualitatively similar results. Colors causing activation of the R7 and R8 class photoreceptors were found to be repellant to the target insects, while colors causing activation of the R1-R6 class photoreceptors were found to be attractive. According to these results, colors which humans perceive as having strong reflectance in the blue-green region and lower reflectance in the yellow-red and violet regions were predicted to be the best attractants for the houseflies.

After the initial models were constructed, predictions of theoretically optimal colors were generated using the Pantone® color book and acquired UV/Visible reflectance spectra for a large set of the colors in the book. The previously obtained fluorescent light spectra were combined with the Pantone® spectra. From these color spectra the photoreceptor activations for each Pantone® color were calculated. This information was combined with the results from the statistical models to calculate the expected attractivity of each Pantone® color, and the predicted best Pantone® colors for attracting the houseflies were selected.

Papers printed with these selected colors were then tested against each other and against competitor sticky tapes. The best of the Pantone® colors we identified generally caught double the number of houseflies as the best of the competitor sticky tape. A rough analysis of the correlation between predicted attraction ranking of the Pantone® colors and the experimental ranking showed a loose correlation. The best of the Pantone® colors were, again, those that to a human appear in the range of blue and blue-green.

In addition, the best results were found using a pixelated pattern formed partially with colors in the blue and blue-green colors with sharp contrasts, strong edge effects, and cluster patterns. As used herein, a pixelated pattern is defined to mean a pattern formed from a number of relatively large pixels or blocks with well-defined edges that are clearly visible against a different-colored background. The pixels or blocks preferably have a characteristic dimension that is within an order of magnitude of the size or characteristic dimension of the target insects. The pixelated patterns disclosed herein, therefore, are distinguishable from prior art patterns formed using conventional smooth continuous lines, and/or patterns comprising fuzzy or blurred patterns.

EXAMPLE 1

Embodiments for Attracting Filth Flies (e.g., Houseflies) and Biting Flies

Figure 1A:
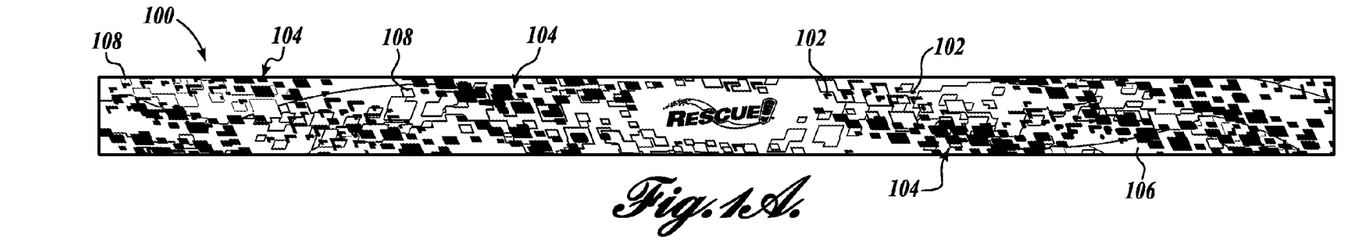
FIG. 1A illustrates a first embodiment of a substrate in accordance with the present invention incorporating a visual attractant directed to attracting filth flies and biting flies, the pattern comprising a pixelated patterns with clustering, wherein the clusters are disposed at an angle to the substrate.
Figure 1B:
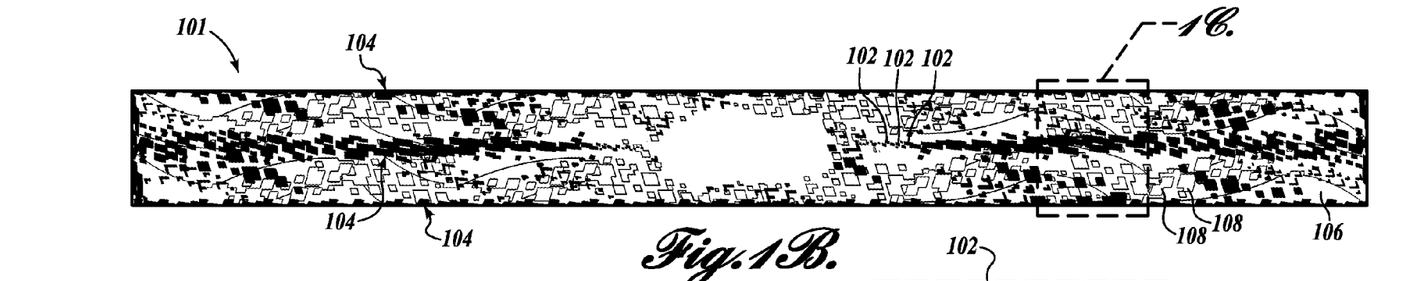
FIG. 1B illustrates a second embodiment of a substrate in accordance with the present invention incorporating a visual attractant comprising a pixelated pattern with longitudinal clustering, also suitable for attracting filth flies and biting flies.
Figure 1C:
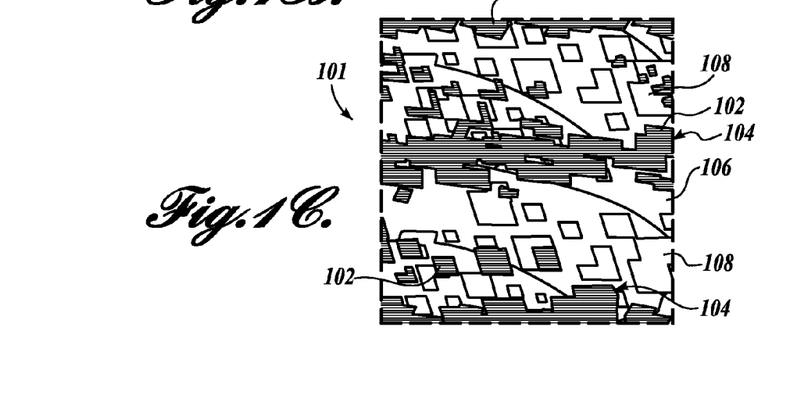
FIG. 1C is a detail view of a portion of the substrate shown in FIG. 1B.

A current embodiment of a visual attractant pattern on an adhesive entrapment strip 100, e.g., a fly tape, is shown in FIG. 1A. A second patterned strip 101 is shown in FIG. 1B. A detail view of section 1C of patterned strip 101 is shown in FIG. 1C. In these embodiments, a pixelated pattern is printed on a substrate. The pixelated patterns comprise a plurality of small, sharply defined blocks 102 of the desired blue and/or blue-green color, for example blocks highly reflective in the wavelength range of 450 nm-495 nm (hereinafter for simplicity referred to as "blue-blocks" 102). Most of the blue-blocks 102 are disposed in elongate cluster patterns 104, such that one or more irregular and intermittent streaks of blue-blocks 102 are apparent. For example, the pattern in FIG. 1A illustrates clusters 104 that extend diagonally across a portion of the strip 100, and the pattern in FIG. 1B illustrates clusters 104 extending longitudinally and along the edges. It is believed to be advantageous to provide the darker clusters 104 along the edges of the strips 100, 101 in order to reduce the visual impact of long, straight lines defined by the edges of the strips. The blue-blocks 102 overlap in places, and are provided in differing sizes and shapes. For some flies, blue-blocks 102 that are darker blues, for example predominantly reflective in the wavelength range of 450 nm-470 nm, have been found particularly effective.

In the current embodiment, the substrate includes a lighter-colored surface 106 with lighter-colored pixelated patterns of blocks 108 that underlie and/or surround the pixelated blue-blocks 102. The lighter-colored portions 106, 108 are reflective over a broad spectrum (e.g., more reflective to white light) to provide a clear demarcation and contrast with the irregular edges defined by the blue-blocks 102. The lighter-colored surface 106 may be printed as an aesthetically pleasing background, for example a background strongly reflective in a lighter shade of blue (blue with white, e.g., sky blue, azure, or Egyptian blue), and/or green.

Desirable aspects of the pixelated pattern of blue-blocks 102 include:

(i) Attractant reflectivity: Best attractive colors for blue-blocks 102 pestiferous insects such as biting flies are blue to blue-green with strong reflectance in the blue-green region (e.g., strong reflectance in the wavelength range of 450 nm-495 nm) and lower reflectance in the yellow-red and violet wavelengths. The overall color combinations/patterns not only are attractive to filth flies and biting flies, but also appealing to the human eyes, which is beneficial for the consumer product.

(ii) Good contrasts: A combination of several attractive colors with different intensities to create strong contrasts. It will be appreciated that the background color portions 106, 108 may also reflect (in part) in the blue to blue-green range, e.g., using much lighter shades of blue containing greater white light reflectivity.

(iii) Strong edge effects: Arrangement of colors/intensity and patterns to achieve elongate visual edges to mimic vertical objects and cracks on surfaces in the natural environment (e.g., trees and other plants), and thereby lure the target insects to alight, for example to rest.

(iv) Clustering patterns: Use of attractive cluster patterns of dark color patches, for example to mimic the localized feeding environment, and thereby alter the behavior of the target insect.

The pixels or blue-blocks 102 may be of differing shapes, including rectangular, rectilinear, square, L-shaped and/or angular. Although polygonal shaped blue-blocks 102 are shown and are currently preferred in this embodiment, it is also contemplated that the blue-blocks 102 may be alternatively shaped, for example circles, ovals, ellipses, or irregular closed curves. The blue-blocks 102 are arranged on the substrate in part to define longitudinal clusters 104 to give the appearance of edge effects, or multiple edges extending lengthwise on the tape 100, 101. In a current embodiment, the lighter-colored surface or background 106 is white, lighter shade(s) of blue, green, or a combination thereof.

It is contemplated that the adhesive may be colored and printed on the substrate to produce the desired pattern, with other portions of the substrate free of adhesive. In a current embodiment, the background and pixelated patterns are printed on the substrate first, and then adhesive is applied.

EXAMPLE 2

Pestiferous Social Wasps

Eusocial vespid wasps include several subfamilies, such as Polistinae, Vespinae, and Polybiinae from Vespidae (Hymenoptera: Vespidae), commonly referred to as paper wasps, yellow jackets, and hornets in North America. These social wasps can be a serious stinging hazard to humans and animals, particularly in defense of their colonies, but some species from the genera *Vespula* (Thomson) and *Dolichovespula* (Rohwer) come into frequent contact with people when scavenging for sugar-rich foods and animal carrion away from their nests. In recent years, paper wasps have caused serious problems in fruit orchards and vineyards by biting the fruit and causing scarring, which results in price devaluation and, at high populations, poses a significant danger to harvesters.

Research efforts to develop control or management strategies for these pestiferous social wasps have focused on poison baits to reduce or eliminate wasps and larvae in the nests, or on chemical attractants or food materials for traps to reduce foraging adult wasp populations (workers or queens). Combinations of pesticides and meats have been used to control the western yellow jacket, *Vespula pensylvanica*; the common yellow jacket, *Vespula vulgaris* (L.); and the German yellow jacket *Vespula germanica* (F.). Although protein-based poison baits showed some regional success, they are not extensively used because of their expense, the short length of time that they are attractive, and significant side-effects on the non-target species and environment. Chemical attractants, including heptyl butyrate and acetic acid plus isobutanol, among others, which are useful in trapping and monitoring vespid wasps, have been reported in several patents and scientific publications. Commercial traps baited with these synthetic attractants have been promoted and used for years as tools for monitoring or controlling the vespid wasps. However, these chemical attractant-baited traps may be ineffective during most of the summer season for many pestiferous species because many of these species are searching for living insect prey on the various vegetations. However, visual signals related to their prey's host plants or flowers might play an important role in their foraging activity. Color combinations, patterns, and contrasts mimicking the plants/flowers with more green and yellow are beneficial to attract this group of pest insects. Pixelated color patterns might be preferred for the social wasps.

Figure 2:
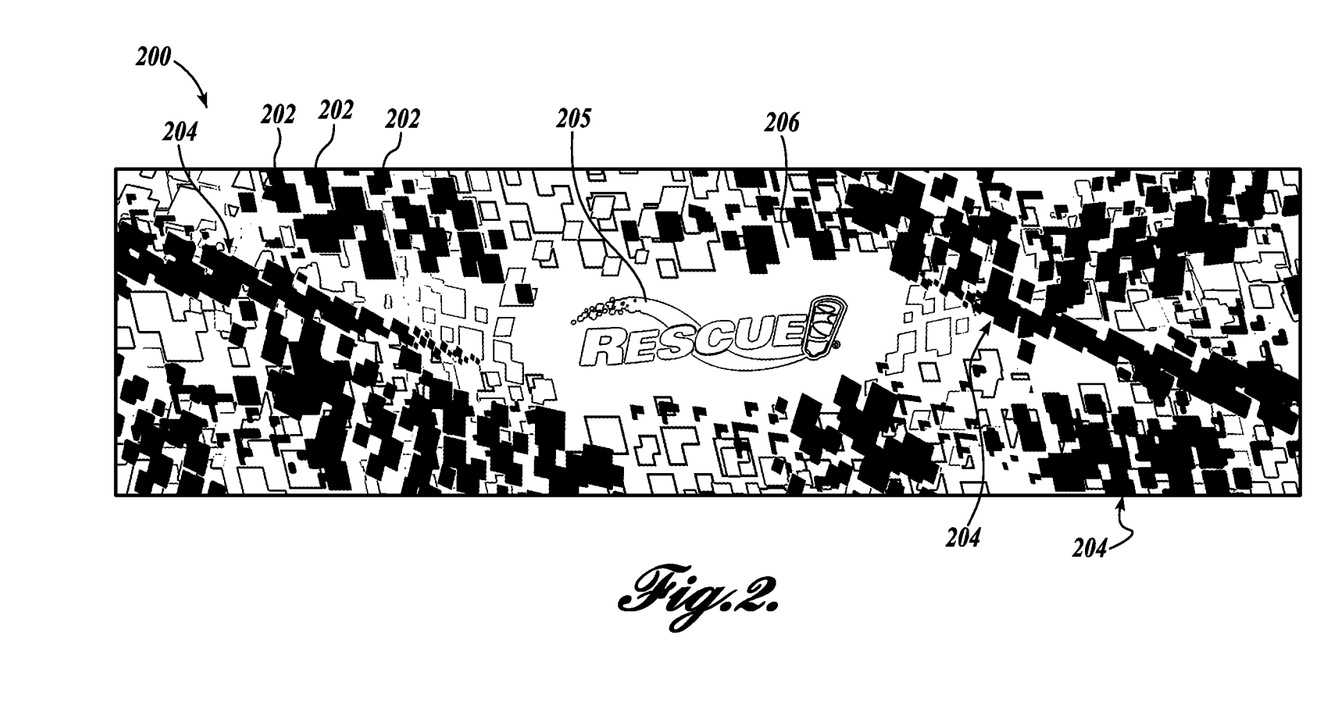
FIG. 2 illustrates a third embodiment of a substrate in accordance with the present invention with a visual attractant suitable for pestiferous social wasps.

FIG. 2 shows another embodiment of a strip 200 with a pixelated pattern. In this example, the pattern is targeted for attracting insects such as social wasps. In this embodiment, a plurality of green and darker green pixel blocks 202 (e.g., wavelength between 495 nm and 515 nm), referred to herein for simplicity as green-blocks 202, are disposed on a lighter-colored substrate 206. A majority of the green-blocks 202 are clustered 204 to produce irregular streaks as discussed above. The lighter-colored background 206 is provided that is a much lighter green, with yellow and yellow-green (e.g., wavelength between 520 nm and 565 nm) providing sharp contrast to the darker green-blocks 202. Optionally, an identifying or decorative indicia 205 may also be provided. Such attractive color patterns can also be incorporated with chemical attractants-baited traps to provide potential visual-olfactory synergistic effects for efficiently catching target insects, such as pestiferous social yellow jackets, paper wasps, and hornets. Exemplary attractants for pestiferous social insects are disclosed in U.S. Publication No. 2011/0165115, to Zhang et al., the disclosure of which is hereby incorporated by reference in its entirety.

It is contemplated that the patterns disclosed herein, for example the strips 100, 101, 200 described above, may be provided on an adhesive surface to entrap the target insects, for example undesirable pest insects of the order Diptera or of the order Hymenoptera. It is also sometimes desirable to attract beneficial insects, for example insects that are helpful to gardens by preying on or parasitizing harmful insects, or insects that aid in pollination. It is desirable to attract such beneficial insects to a desired region without entrapping or otherwise interfering with the insects natural activities. Examples of beneficial insects are many, and include lacewings and other beneficial insects from several orders discussed above. Patterns formed that are predominantly reflective in the range of 500 nm-700 nm have been found effective at attracting beneficial insects.

EXAMPLE 3

Incorporating Images Showing or Suggesting Insects

The above-described embodiments comprise substrates with visual attractant patterns formed from pixels or blocks having a characteristic dimension similar to the target insect (e.g., within an order of magnitude of the target insect size). The present inventors have further found that the performance of the patterns for attracting the target insects may be significantly improved by incorporating images of insects, portions of insects, or characteristics of insects. For example, the performance of the patterns may be improved by incorporating images of the target insects (for social insects) and/or by incorporating images of the prey of the target insects.

Figure 3A:
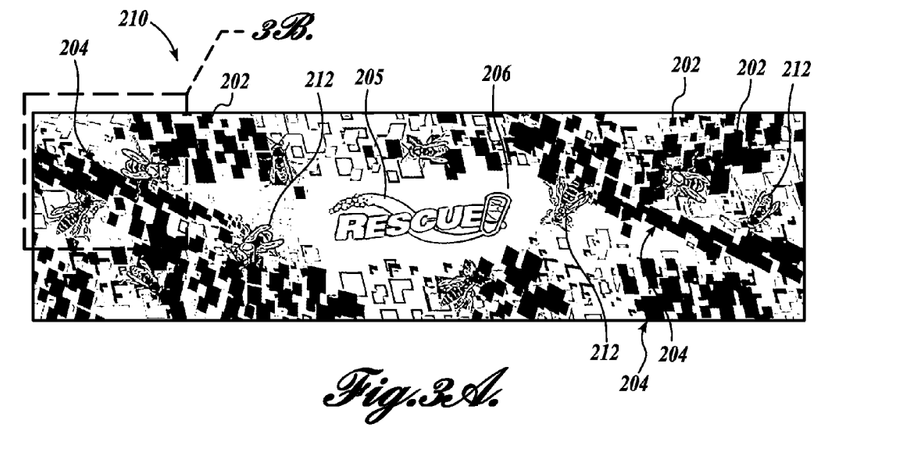
FIG. 3A illustrates a fourth embodiment of a substrate in accordance with the present invention, and including a visual attractant comprising a pixelated pattern with clustering, and further including caricature images of pestiferous wasps.

FIG. 3A illustrates an exemplary embodiment of a substrate 210, for example a strip with a pixelated pattern for attracting pestiferous social wasps, wherein the pattern is similar to the pattern shown for the strip 200 of FIG. 2. In particular, the pixelated pattern includes green-blocks 202 arranged in irregular clusters 204 and disposed on a lighter-colored background 206. In this embodiment, the pattern on the substrate 210 further includes images of insects, in this example caricature images of other pestiferous social wasps 212.

Figure 3B:
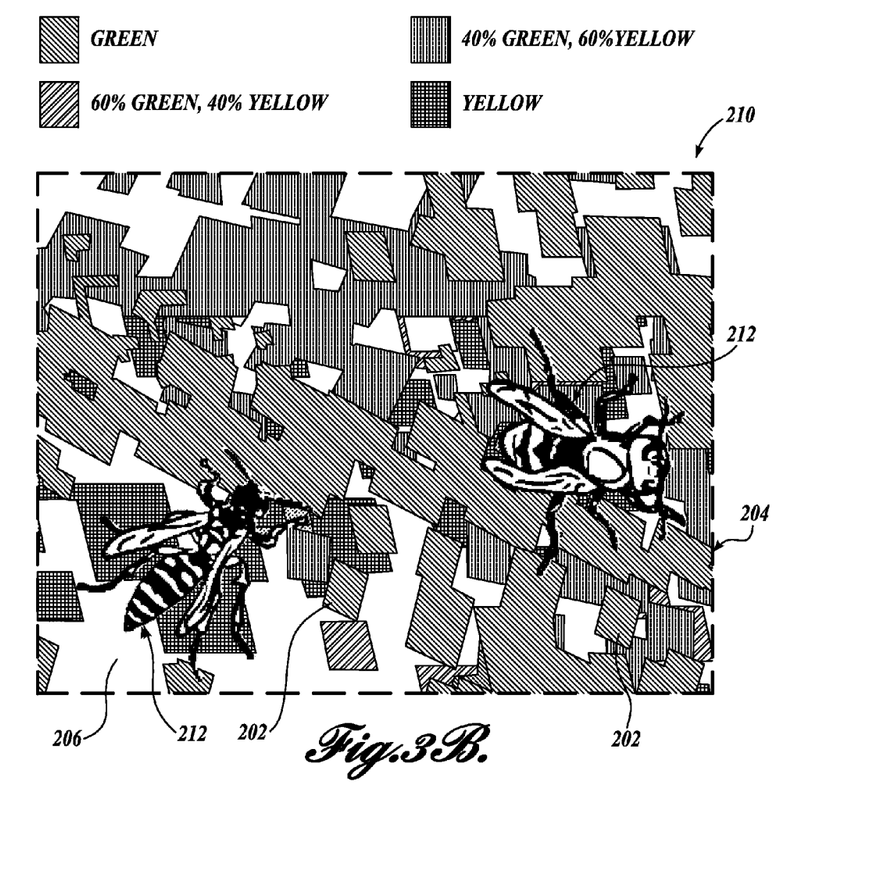
FIG. 3B is a detail view of a portion of the substrate shown in FIG. 3A, with the color of the pattern on the substrate indicated.

A detail view of section 3B of the substrate 210 with portions of the pattern color-coded as indicated by lining is shown in FIG. 3B. Darker green pixels or green-blocks 202 are distributed, partially in elongate clusters 204, with lighter colored blocks and substrate (e.g., much lighter colors reflective in yellowish hues).

In this embodiment, the insect images 212 are caricatures of the target pestiferous social wasps. In other embodiments, the images 212 are photorealistic images of the target pestiferous insects. In yet other embodiments, the images 212 are silhouettes of the target pestiferous insects. Due to the relatively well-developed visual apparatus and relatively primitive neurological systems of insects, all of these different imaging strategies have been found successful.

Other options for imaging insects on the substrate will be apparent. For example, images of only portions of pestiferous social insects, (e.g., heads, body segments, or outlines) of pestiferous social insects or prey may alternatively be used. Similarly, images based on the body striping of the pestiferous social insects may be used.

Figure 4A:
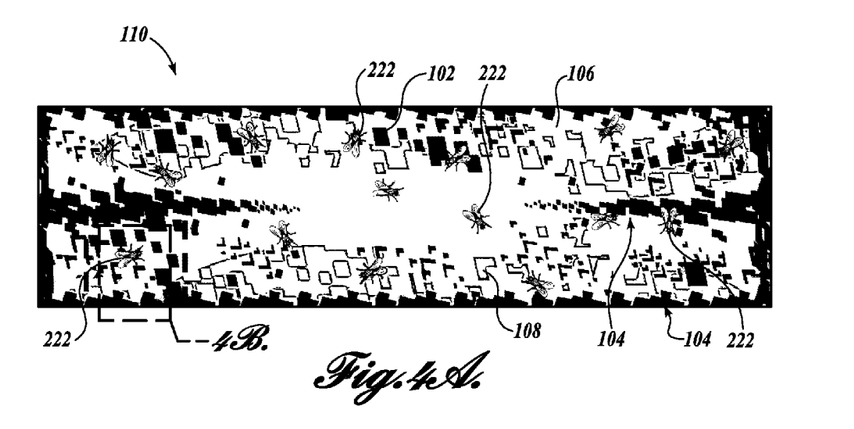
FIG. 4A illustrates a fifth embodiment of a substrate in accordance with the present invention and including a visual attractant comprising a pixelated pattern with clustering, and further including images of pestiferous biting flies.

FIG. 4A illustrates a strip 110 having a pixelated pattern of clustered 104 blue-blocks 102 similar to the pattern in the strip 101 shown in FIG. 1B, disposed on a substrate of lighter-colored portions 106, 108. The strip 110 is therefore directed to attracting flies, such as biting flies or filth flies. In this embodiment, the pattern on the strip 110 further includes images of insects 222, for example images of biting flies.

Figure 4B:
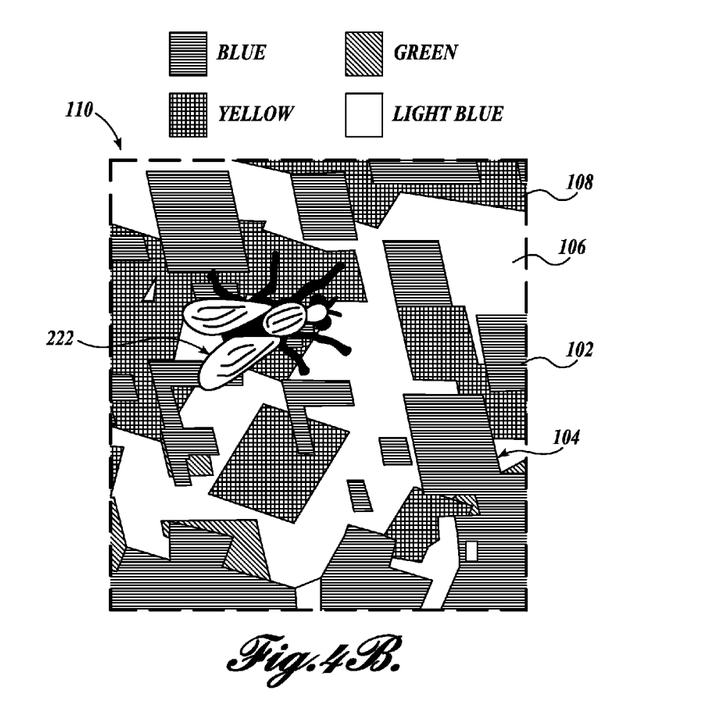
FIG. 4B is a detail view of a portion of the substrate shown in FIG. 4A, with the color of the pattern on the substrate indicated.

A detail view of section 4B of the strip 110 is shown in FIG. 4B. In this embodiment, the biting fly images 222 are caricature-type images. However, as discussed above, the images in alternative embodiments may be photorealistic images, silhouettes, or fragmentary images of biting flies, for example. Additional examples of visual attractant patterns, including insect images for attracting target insects are shown in the priority U.S. Provisional Application No. 61/732,891, which is incorporated by reference above.

EXAMPLE 4

Fly Tape Cartridge

A fly tape cartridge 300 for use with fly tape embodying the visual attractant for target insects described above will now be described.

Figure 5A:
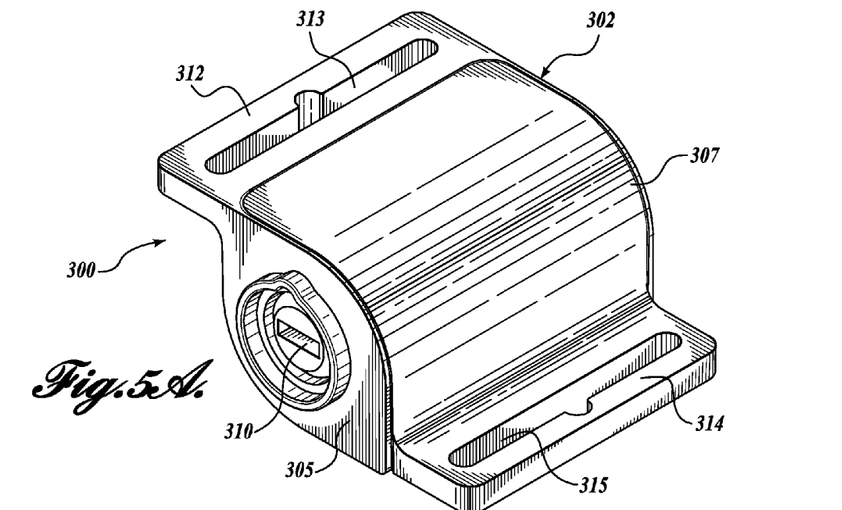
FIG. 5A is a perspective view of a fly tape cartridge in accordance with the present invention, shown in a closed position.

A current embodiment of an integrated fly tape and cartridge 300 is shown in FIG. 5A, which shows the cartridge 300 in a closed position. The cartridge 300 includes a two-part cartridge 302, with a body portion 305 and a cover portion 307. In this embodiment, the cover portion 307 is configured to interlock with the body portion 305, for example with a snap- or friction-fit to the body portion 305, such that the cover portion 307 is releasably fixed to the body portion 305 and can be readily pulled away from the body portion 305. A spool 310 is rotatably mounted inside the cartridge 302.

Figure 5B:
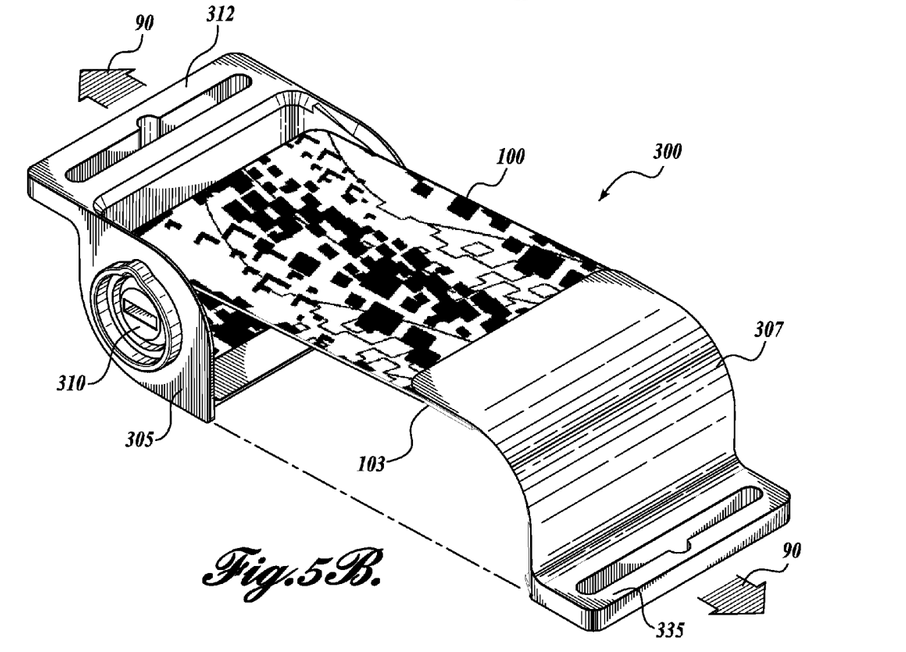
FIG. 5B is a perspective view of the cartridge shown in FIG. 5A, in an open or deployed position with a section of the fly tape shown incorporating the visual attractant shown in FIG. 1A.

FIG. 5B shows the cover portion 307 pulled away from the body portion 305, as indicated by arrow 90. The fly tape 100 in this embodiment is the tape 100 shown in FIG. 1A, although any tape in accordance may alternatively be used. The tape 100 is wound onto the spool 310, with a first end (not shown) fixedly attached to the spool 310, and a second end 103 fixedly attached to the cover portion 307. As the cover portion 307 is pulled away from the body portion 305, the fly tape 100 unwinds from the spool 310.

The fly tape 100 is preferably formed from a relatively strong substrate having a tacky adhesive applied on one or both sides of the substrate. It will be appreciated that some force is required to unwind the fly tape 100 due to the adhesive surfaces. Of course, the amount of force required will be a design parameter which can be selectively moderated by various means, including the choice of the adhesive material, the thickness of the adhesive and its coverage area, the pattern of application of the adhesive, as well as the original winding tension applied to the fly tape 100. It is also contemplated that a nonstick release paper (not shown) may be provided along the length of the fly tape 100, which a user would remove during deployment of the fly tape 100. The body portion 305 and the cover portion 307 provide convenient handles for unrolling the fly tape 100.

To deploy the fly tape, the body portion 305 may be securely fixed to a desired fixture, and the cover portion 307 pulled away to deploy the fly tape 100 to a desired length. The cover portion 307 may then be fixed to a second fixture. It will now be appreciated that this construction allows the fly tape 100 to be deployed in any desired orientation. The fly tape 100 may be deployed horizontally, for example slightly below the top of a door frame, by attaching the body portion 307 of the two-part cartridge 302 to one side of the door frame and pulling the cover portion 307 across to the other side, and fixing it there. In particular, because some force is required to deploy the fly tape 100, the deployed fly tape 100 will remain at the desired position and will not tend to sag to where it might become a nuisance.

The cartridge 302 in this embodiment is generally rectangular in shape with rounded corners, although other shapes are contemplated, including square or circular cartridges. The spool 310 is mounted to the side walls of the body portion 305. The body portion 305 includes a tab 312 having an elongate slot 313 for mounting the body portion 305 to any desired fixture, for example to a ceiling, wall, or other surface. The cover portion 307 has a similar tab 314 and an elongate slot 315 for attaching the cover portion to any desired fixture.

The fly tape 100 substrate in one embodiment is plastic, although other suitable materials such as paper and cloth are also contemplated. The plastic substrate is selected to have enough strength to withstand the force required to deploy the fly tape 100.

EXAMPLE 5

Pillar Embodiment

Figure 6A:
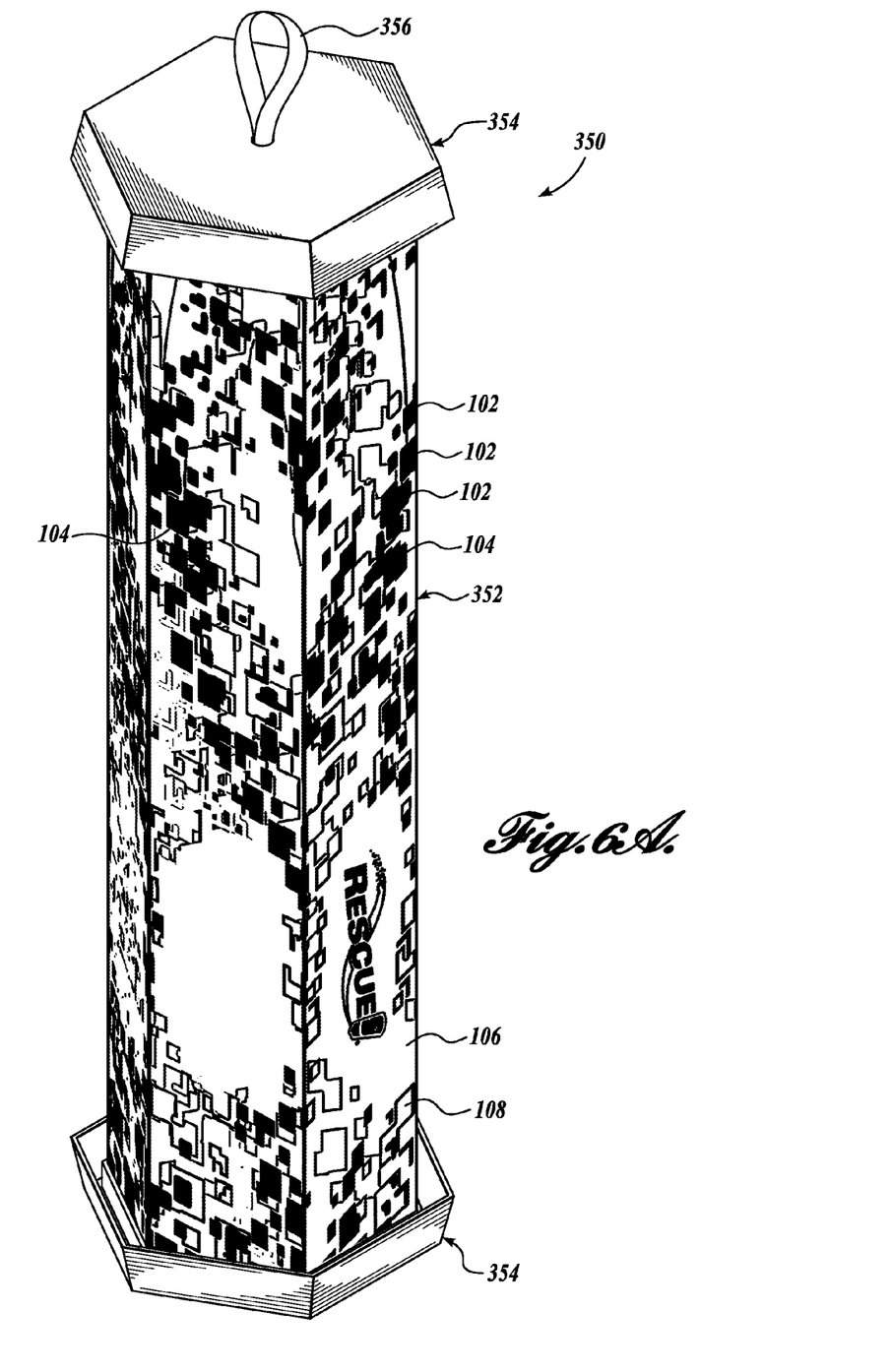
FIG. 6A is a perspective view of a pillar-type or stick-type device in accordance with the present invention, which may have adhesive surfaces for trapping insects, or have only non-adhesive surfaces for operation as a non-capturing attracting device.

A visual attractant pillar (or stick) 350 embodiment is shown in FIG. 6A. The pillar 350 may be implemented with an entrapping outer surface, for example with a sticky exterior, or with a non-sticky exterior to attract target insects without entrapment. For convenience, the trap embodiment will now be described with referenced to FIGS. 6A-6C. The pillar 350 includes a pillar (or stick) portion 352 formed in the tubular shape, with a patterned outer surface. The outer surface is covered, at least in part, with an entrapping adhesive, as discussed above. For example, the pixelated pattern may be similar to that shown in FIG. 1A for attracting filth flies, or in FIG. 4A for attracting biting flies, and including blue-blocks 102 disposed in elongate clusters 104, and having a desired color (e.g., blue-green and blue), and disposed on a highly contrasting background 106. The background 106 may also include a plurality of light-colored pixel elements 108.

In this embodiment, the pillar 350 includes upper and lower end cap portions 354 that are attached to opposite ends of the pillar portion 352 and facilitate hanging the pillar 350, for example with a hanger member 356, by standing the pillar 350 on a flat surface or by supporting the pillar 350 on an upright support (not shown).

In this exemplary embodiment, the pillar portion 352 has six sides and may be configured, for example, with a constant-area cross section defining a regular hexagon. It will be appreciated, of course, that other shapes are possible. For example, the cross section may be triangular, square, pentagonal, etc., and does not need to be regular. Although a circular tube for the pillar portion 352 is contemplated, a pillar having well-defined, elongate vertical edges is believed to be more effective. In current embodiments, the pillar portion 352 is between about six-inches long and three-feet long, and has a characteristic transverse dimension between about one inch and six inches. In a particular embodiment, the pillar portion 352 is a regular hexagonal tube having a length of about 10-12 inches, and a width of each side of about 1.0-1.5 inches. The optimal dimensions may depend on the specific application. For example, in an agricultural setting such as a field or an orchard, it may be desirable to use traps having a much larger pillar portion 352.

Figure 6B:
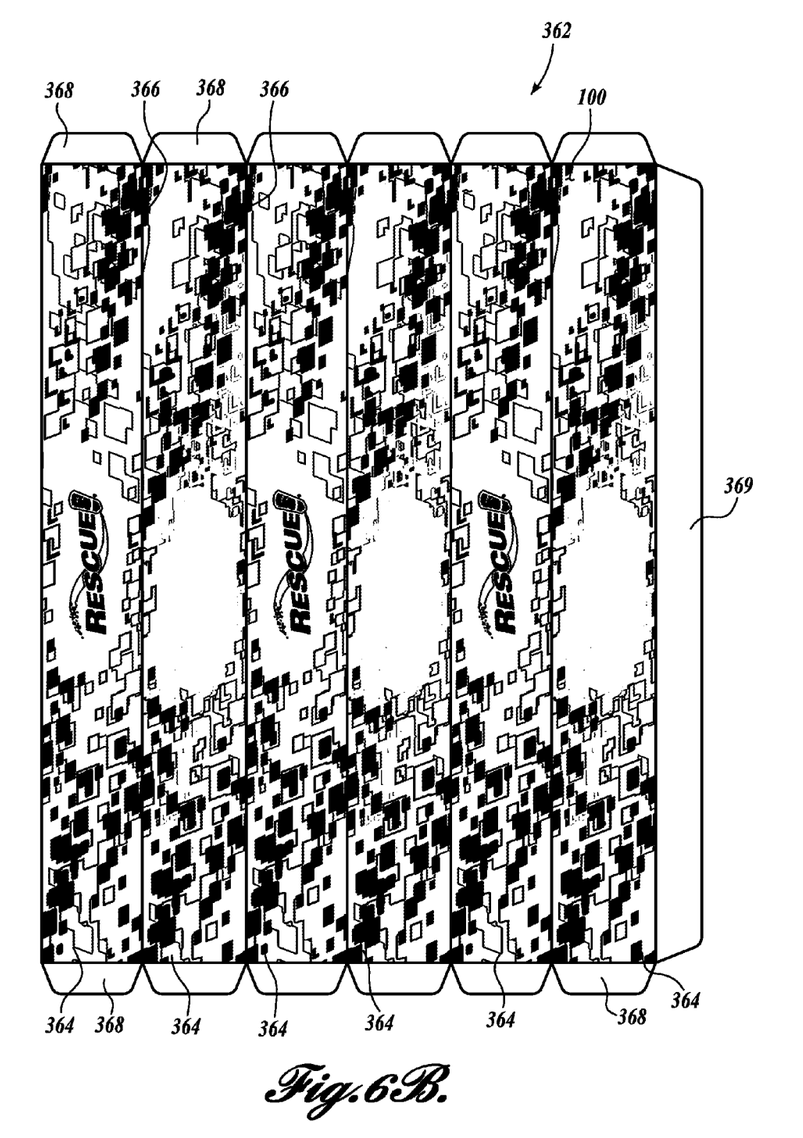
FIG. 6B is a flat plan panel for forming the pillar portion of the device shown in FIG. 6A, and shown with a pattern for attracting various filth flies.

As shown in FIG. 6B, the pillar portion 352 may be constructed from a flat plan panel 362 having the desired insect-attracting pattern printed or applied thereon. For example, six of the strips 100 illustrated in FIG. 1A may be applied or otherwise provided to the flat plan panel 362 for attracting various filth flies, such as houseflies. The flat plan panel 362 for the hexagonal pillar portion 352 comprises six cooperatively hinged rectangular panels 364 having a crease or score line 366 between neighboring panels 364. A side tab 369 is provided on one side, and end attachment tabs 368 are provided on each end.

Figure 6C:
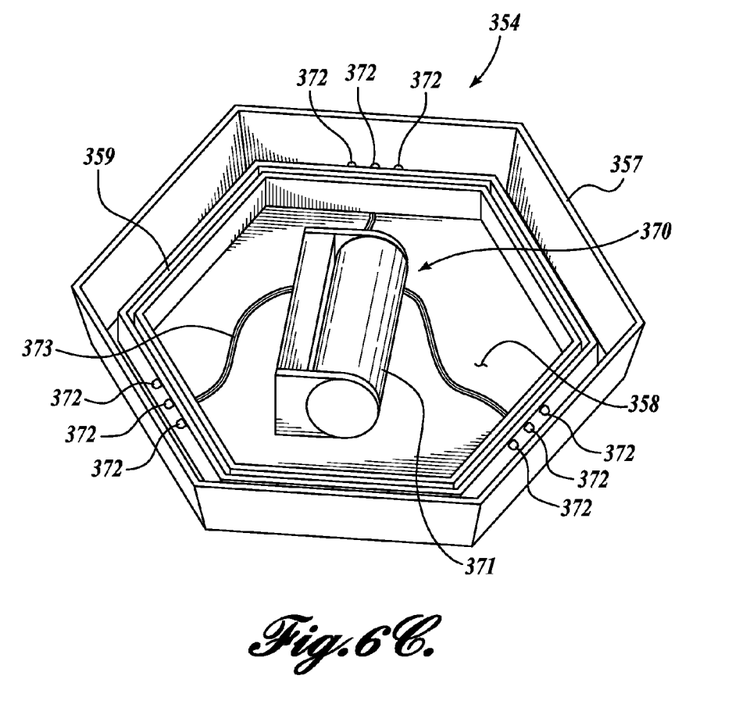
FIG. 6C is a perspective view of the end cap portion of the device shown in FIG. 6A, with an optional lighting system.

An exemplary end cap portion 354 is shown in FIG. 6C and includes an outer wall 357, a floor portion 358, and a hexagonal channel 359 defined on the floor portion 358 and configured to receive the end attachment tabs 368 extending from the assembled the pillar portion 352. The top and bottom end cap portions 354 may be substantially the same.

The end tabs 368 are configured to engage the end cap portions 354. To assemble the pillar 352, the user simply folds the rectangular panels 364 about 120° along the score lines 366 and attaches the side tab 369 to the opposite rectangular panel 364, for example with an adhesive.

An optional lighting system 370 is also shown fixed to the end cap portion 354. In this embodiment the lighting system 370 includes a power supply, for example a battery 371 attached to the floor portion 358, and operatively connected with leads or traces 373 to lighting elements 372, for example light emitting diodes disposed outwardly from the channel 359. The lighting elements 372 may be selected to emit light in a frequency range attractive to the target insect, or may illuminate the pillar portion 352. Alternatively, the lighting elements may be configured to emit light in the desired wavelength and to extend through, or be a part of, the pillar portion 352, forming some or all of the desired pixelated pattern. In another alternative, the pillar portion 352 may be partially translucent, and the lighting element(s) 372 disposed inside the pillar portion 352, such that light is partially transmitted and partially absorbed through the translucent portions of the pillar 352, to generate the desired pattern.

Referring again to FIG. 6A, the pixels (e.g., blue-blocks 102) may be of any shape, and are colored based on the particular behavioral characteristics of the target insect, for example based on the nerve signals generated by the insect visual sensory machinery in response to the color and the observed behavior of the target insect. Preferably, most of the pixels are sized to have a characteristic dimension that is on the same order of magnitude as the size of the target insect. A significant portion of the pixels 102 are patterned on the substrate in clusters to define irregular elongate streaks 104. Clustered pixels 102 may cover, for example, 5% to 50% of the printed surface of the panels 364, and may be clustered or grouped such that 90% of the pixels 102 by area are disposed within 0.5 cm of another pixel 102. This clustering produces a visible pattern on the substrate. It will be appreciated that the pixels 102 may overlap to produce larger aggregations of pixels 102.

It has also been found to be beneficial to cluster the pixels 102 in a cluster pattern that produces generally vertical or upright patterns, such that the pattern formed by the pixels, such as blue-blocks 102, which are typically darker than the contrasting background 106, give an appearance of upright irregular streaks resembling cracks. In a preferred embodiment, therefore, the pixels 102 in a particular clustering arrangement are more closely spaced in the vertical direction than in the horizontal direction. Upright clustered pixels 102 are defined to be clustered pixels arranged such that a plurality of elongate upright closed curves may be drawn extending the length of the pillar portion 352 that encloses not more than 33% of the surface area of the pillar portion and encloses at least 66% of the insect-attracting colored pixels 102. In another embodiment, a plurality of elongate upright closed curves may be drawn extending the length of the pillar portion 352, that enclose not more than 25% of the surface area of the pillar portion 352, and that enclose at least 75% of the insect-attracting colored pixels, e.g., blue-blocks 102.

For filth flies such as houseflies, the attractive color combination/ratio, pixel patterns/sizes, contrast, clustering, and edge effects are the same or very similar to the fly tapes. However, for biting flies such as stable flies among others, more blue color and less green and yellow will be beneficial for enhanced attraction. In one embodiment, a relatively small number of silver pixels are scattered across the active surface to create a sparkling effect to draw attention of biting flies from longer distances. Other parameters, such as pixel patterns/sizes, contrast, clustering, and edge effects, are similar to the ones for filth flies.

Although FIGS. 3A-4B illustrate insect images on strips superimposed on the pixelated patterns, it is contemplated that insect images, for example high resolution photorealistic images, three-dimensional images, caricature images, silhouette images, and/or fragmentary images, may advantageously be provided on substrates without pixelated patterns. For example, insect images in one embodiment are provided on a uniformly colored substrate, such as a white or green substrate. In other embodiments, the substrate may be transparent, semi-transparent, or translucent. In other exemplary embodiments, insect images are printed on a substrate that is otherwise colored to blend in with a particular environment, e.g., with camouflage, disruptive patterning, and/or foliage patterning.

High resolution and/or photorealistic images, for example, are contemplated to be particularly effective, taking advantage of the well-developed vision sensory organs of many insects. For example, high resolution fragmentary portions of insects may be printed on a substrate to create an illusion of an insect in a natural environment partially concealed by foliage, bark, or natural detritus.

The substrates may be partially or fully coated with a sticky layer, for example a glue as discussed above (for attracting and entrapping pestiferous insects), or may be benign (for simply attracting beneficial insects).

While illustrative embodiments have been illustrated and described, it will be appreciated that various changes can be made therein without departing from the spirit and scope of the invention.

The embodiments of the invention in which an exclusive property or privilege is claimed are defined as follows:

1. A visual attractant for attracting a target insect, the visual attractant comprising:
a substrate having (i) a pixelated pattern portion defining a pattern comprising a plurality of blocks having a characteristic dimension that is within an order of magnitude of the size of the target insect and wherein the plurality of blocks are a first color and highly reflective in a wavelength range selected to attract the target insect, and (ii) a background portion that is a lighter color than the first color, such that the plurality of blocks contrast sharply with the background portion to define an irregular edge; and
wherein the plurality of blocks are clustered on the substrate such that most of the plurality of blocks define one or more irregular elongate streaks on the substrate.

2. The visual attractant of claim 1, wherein the plurality of blocks are predominantly reflective in a wavelength range of 450 nm-495 nm, such that the pixelated pattern is attractive to biting flies and filth flies.

3. The visual attractant of claim 1, wherein the plurality of blocks are predominantly reflective in the wavelength range of 495 nm-515 nm, such that the pixelated pattern is attractive to social wasps.

4. The visual attractant of claim 3, further comprising a plurality of blocks that are predominantly reflective in the wavelength range of 520 nm-565 nm.

5. The visual attractant of claim 1, wherein the substrate further comprises a plurality of insect images.

6. The visual attractant of claim 5, wherein the insect images comprise images of the target insect.

7. The visual attractant of claim 5, wherein the insect images comprise one or more of photorealistic images, caricature images, and silhouette images.

8. The visual attractant of claim 1, wherein the substrate comprises an adhesive surface configured to entrap the target insect.

9. The visual attractant of claim 8, wherein the pixelated pattern portion is formed on the substrate by a colored adhesive, thereby defining at least a portion of the adhesive surface.

10. The visual attractant of claim 8, further comprising a cartridge for deploying the fly tape, the cartridge comprising a two-part cartridge consisting of a body portion rotatably mounting a spool that is attached to a first end of the substrate, and a cover portion that is separable from the body portion and is fixedly attached to a distal end of the substrate.

11. The visual attractant of claim 1, wherein the substrate defines an outer wall of a cylindrical pillar.

12. The visual attractant of claim 11, further comprising two end cap portions that are configured to attach to opposite ends of the cylindrical pillar.

13. The visual attractant of claim 11, wherein the outer wall is adhesive, such that the pillar is configured to entrap the target insect.

14. The visual attractant of claim 11, wherein the elongate cylindrical pillar has a polygonal cross section.

15. The visual attractant of claim 1, further comprising a semiochemical attractant disposed with the visual attractant.

16. The visual attractant of claim 15, wherein the semiochemical attractant is incorporated into an adhesive that is applied to the substrate.

17. A strip configured to entrap a target insect, the strip comprising:
an elongate substrate having an adhesive surface with an irregular pattern printed on the elongate substrate comprising a plurality of colored blocks, wherein the colored blocks are (i) highly reflective in a wavelength that is attractive to the target insect, (ii) sized to be within an order of magnitude of the size of the target insect, and (iii) clustered on the elongate substrate, such that most of the plurality of colored blocks define one or more elongate streaks on the elongate substrate.

18. The strip of claim 17, wherein the plurality of blocks are highly reflective in a wavelength range of 450 nm-495 nm, such that the plurality of blocks are a blue.

19. The strip of claim 17, wherein the plurality of blocks are highly reflective in a wavelength range of 495 nm-515 nm.

20. The strip of claim 19, further comprising a plurality of blocks that are predominantly reflective in the wavelength range of 520 nm-565 nm.

21. The strip of claim 17, wherein the irregular pattern printed on the elongate substrate further comprises a plurality of insect images.

22. The strip of claim 21, wherein the insect images comprise images of the target insect.

23. The strip of claim 22, wherein the insect images comprise one or more of photorealistic images, caricature images, and silhouette images.

24. The strip of claim 22, wherein the irregular pattern is printed on the elongate substrate, and an adhesive is applied over the irregular printed pattern to form the adhesive surface.

25. The strip of claim 17, further comprising a two-part cartridge consisting of a body portion rotatably mounting a spool that is attached to a first end of the elongate substrate, and a cover portion that is separable from the body portion and is fixedly attached to a distal end of the elongate substrate.

26. The strip of claim 17, wherein the elongate substrate comprises a plurality of panels that are configured to define an outer wall of a cylindrical pillar.

27. The strip of claim 26, further comprising two end cap portions that are configured to attach to opposite ends of the cylindrical pillar.

28. The strip of claim 27, wherein the elongate cylindrical pillar has a polygonal cross section.

29. The strip of claim 17, further comprising a semiochemical attractant disposed with the visual attractant.

30. The strip of claim 29, wherein the semiochemical attractant is incorporated into an adhesive that is applied to the substrate.

* * * * *